US006665642B2

(12) United States Patent
Kanevsky et al.

(10) Patent No.: US 6,665,642 B2
(45) Date of Patent: Dec. 16, 2003

(54) TRANSCODING SYSTEM AND METHOD FOR IMPROVED ACCESS BY USERS WITH SPECIAL NEEDS

(75) Inventors: Dimitri Kanevsky, Ossining, NY (US); Alexander Zlatsin, Yorktown Heights, NY (US)

(73) Assignee: IBM Corporation, Armonk, NY (US)

( * ) Notice: Subject to any disclaimer, the term of this patent is extended or adjusted under 35 U.S.C. 154(b) by 374 days.

(21) Appl. No.: 09/726,137

(22) Filed: Nov. 29, 2000

(65) Prior Publication Data

US 2002/0065658 A1 May 30, 2002

(51) Int. Cl.[7] .................. G10L 13/08; G10L 21/06; G06F 17/28
(52) U.S. Cl. ............... 704/260; 704/271; 704/270.1; 704/2
(58) Field of Search ............... 704/260, 271, 704/270.1, 2; 709/203, 218, 221, 224, 231

(56) References Cited

U.S. PATENT DOCUMENTS

| 5,109,509 | A | | 4/1992 | Katayama et al. .......... 395/600 |
| 5,858,814 | A | | 1/1999 | Goossen et al. |
| 5,978,401 | A | | 11/1999 | Morgan |
| 5,991,719 | A | | 11/1999 | Yazaki et al. ............... 704/251 |
| 6,311,215 | B1 | * | 10/2001 | Bakshi et al. ............... 709/221 |
| 6,366,947 | B1 | * | 4/2002 | Kavner ....................... 709/203 |
| 6,389,462 | B1 | * | 5/2002 | Cohen et al. ............... 709/218 |
| 6,396,805 | B2 | * | 5/2002 | Romrell ...................... 709/224 |
| 2003/0018795 | A1 | * | 1/2003 | Ebling et al. ............... 709/231 |

OTHER PUBLICATIONS

Smith et al ("Transcoding Internet Content For Heterogeneous Client Devices", Proceedings of the 1998 IEEE Symposium on International Circuits and Systems, May 1998).*

Hanson ("Institutional And Web Activities: Web Access For Elderly Citizens", Proceedings of the 2001 EC/NSF Workshop On Universal Accessibility Of Ubiquitous Computing: Proving For The Elderly, May 2001).*

Huang et al2 ("Aurora: A Comceptual Model For Web–Content Adaptation To Support The Universal Usability Of Web–Based Services", Proceedings of the Conference on Universal Usability, Nov. 2000).*

Satyanarayanan ("Digest Of Proceedings Seventh IEEE Workshop On Hot Topics In Operating Systems", Mar. 1999).*

"Access to Electronic Information by People with Disabilities", Michael G. Paciello, Yur Insight Foundation, pp. 235–239.

M. Ajmone Marsan et al, Modelling Slotted Multi–Channel Ring All–Optical Networks, *IEEE*, 1997, p. 146–153.

Marco Ajmone Marsan et al, Access Protocols for Photonic WDM Multi–Rings with Tunable Transmitters and Fixed Receivers, *SPIE*, pp. 59–72, vol. 26921.

Carl Beckmann, Applications: Asynchronous Transfer Mode and Synchronous Optical Network, *Handbook of Fiber Optic Data Communication*, 1998, pp. 385–414, Academic Press.

Floyd E. Ross, An Overview of FDDI: The Fiber Distributed Data Interface, *IEEE Journal on Selected Areas in Communications*, Sep. 1989, pp. 1043–1051, vol. 7 No. 7.

* cited by examiner

*Primary Examiner*—Doris H. To
*Assistant Examiner*—Daniel A. Nolan
(74) *Attorney, Agent, or Firm*—Dilworth & Barrese LLP (57) ABSTRACT

A system and method for providing transformed web pages to users with special needs is presented. In one aspect of the system and method, a Translator/Mediator Server is located between the user and the web site. The Translator/Mediator Server translates and transforms the web pages that the user requests from the web site. The translation and transformation of the web pages is directed towards the particular needs of the user.

16 Claims, 10 Drawing Sheets

TRANSCODING SYSTEM AND METHOD FOR IMPROVED ACCESS BY USERS WITH SPECIAL NEEDS

BACKGROUND OF THE INVENTION

1. Field of the Invention

This invention relates to a system and method for providing improved access to Internet websites for those with special needs, such as people with disabilities, children, and the computer-illiterate, in general, and, in particular, to a system and method that provides a platform which interprets and translates web pages for users with special needs, where the original web pages are not necessarily modified for users with special needs.

2. Description of the Related Art

Although the term "Internet" is properly used to describe a specific worldwide collection of networks that use IP/TCP (Internet Protocol/Transmission Control Protocol) for communication links, the term "Internet" is used in the vernacular to describe what can be accessed using a web browser, namely, web pages providing audio/visual content, Java programs, and interfaces that allow the input and output of information from a data source. In addition, most people associate e-mail systems, such as Microsoft Outlook™ or Qualcomm Eudora™, with the term "Internet", partly because many people access their e-mail using a web browser, partly because it seems to come down the same pipeline. In the following description, the term "Web" will be used to describe these and other user-friendly functions and interfaces that are available over the Internet.

When a person accesses the Web using a web browser, she usually uses URL (Uniform Resource Locator) addresses or bookmarks, which are essentially shortcuts for URLs, in order to navigate through the Web. A URL has three parts: the protocol used by the resource (such as http), the DNS (Domain Name Service) name of the machine, or web server, where the resource is located, and the local name for the resource on the machine where the resource is located. Bookmarks simplify this process, by allowing the user to save the URL for later use, so the user will not have to input all of the characters representing the URL again. Most users see the Web as a huge collection of web pages, which are stored and maintained on web servers, and navigated by entering URLs, or selecting bookmarks, or clicking "links", which will be discussed more fully below.

The protocol used to transfer web pages is the HyperText Transfer Protocol (HTTP), which describes the requests sent by web browsers to web servers, and the responses sent from the web servers back to the web browsers. When a user enters a URL for a web page as a destination in a web browser, the web browser sends a GET request to the appropriate web browser, which responds by sending the appropriate web page. Web pages are written in a language called HyperText Markup Language (HTML). HTML involves "hypertext", which is much more than mere text, and provides for links to other web pages, as well as pointers to other resources. HTML is a "markup" language because it describes how documents are to be formatted. Although all web pages are written in a version of HTML (or other similar markup languages), the user never sees the HTML, but only the results of the HTML instructions. For example, the HTML in a web page may instruct the web browser to retrieve a particular photograph stored at a particular location, and show the photograph in the lower left-hand corner of the web page. The user, on the other hand, only sees the photograph in the lower left-hand corner.

In many ways, HTML is the heart of the Web, because it allows for the easy, user-friendly nature of navigation through the Web, as well as the user-friendly appearance of web pages. Many web pages have "links", which can be in the form of text, an icon, a graphic, a photograph, etc., and, merely by clicking on the link, the user may download another web page or a resource, such as an audio file, a program, a text file, etc. In this context, the terms "click" and "double-click" signify a user pressing the button on a mouse attached to a personal computer (PC), when the cursor controlled by the mouse is over a particular area on the computer screen of the PC. A user may move from web page to web page, or resource to resource, merely by clicking particular objects on the screen, rather than entering lengthy URL addresses. In addition, as stated above, users may save particular URLs as bookmarks, for easy retrieval.

HTML also allows for the use of "forms", which allows for the input of information on the web page, and which sends the input information to a URL indicated by the HTML. In addition, the Common Gateway Interface (CGI) provides a standard for an interface between a database and the Web. There is a script, or program, that provides the parameters and methods of the interface. The location of this script is indicated by a URL, and is referred to by the HTML of the web page. Thus, the input information of a form is often sent to the URL of a CGI script, which then interfaces with a database.

The interactivity of web pages is further increased by the use of Java™ applets, which are referred to within an HTML page by the URL where they are located. Unlike CGI scripts, which are kept and run at the web server end, applets are downloaded from the web server to the web browser, where they are run. Further unlike CGI scripts, applets are fully functional mini-programs, which may be used to embody a game, a complex form that changes depending upon input (such as a spreadsheet which shows totals in real-time), or active multimedia. Animation and sound may be embedded in a web page using an applet, without the need of spawning an external multimedia viewer. In addition, because it is run locally, in the user's web browser, an interactive applet is much faster than downloading responses over the Web.

However, the advantages and interactivity of HTML web pages, which use CGI scripts and Java™ applets, may be lost on users with special needs. Users with special needs include the blind or vision-impaired, the deaf or hearing-impaired, the dyslexic, and the computer illiterate. For these users, the Web is neither easy nor user-friendly.

For the blind, the problems with a system which is mostly based on visual cues are obvious. Even the simplest component of a web page, the text, can not be apprehended by the blind. To a greater extent, the links, graphics, and interactive modules are not user-friendly for the blind. All of this information could be stored in the form of audio files, or be translated in real time by a text-to-speech synthesizer. However, if audio files comprising the information are stored and transported from the web page, the web server would need to store a large amount of additional material and the operator of the website would need to create a large amount of additional material. If a text-to-speech synthesizer is used, the information contained and related by the spatial relationship between text and other objects on the website would be lost. In addition, loss of these spatial relations may make the resulting audio incomprehensible or difficult to understand or follow.

For the deaf or hearing-impaired, the audio cues that are a part of many websites have no effect. On may web pages, audio material is used to indicate activity, such as computer processing or searching, and problems, such as a lost connection. Furthermore, audio material is part of many multimedia presentations, and may include vital information for understanding or appreciating the presentation. One solution would be to have a live interpreter, either present in the room or connected over a network, who would give the deaf or hearing-impaired user through the audio material. Another solution would be to have an Automatic Speech Recognition (ASR) program in the web browser, but this would only be effective for human speech, and not for audio cues or material such as music.

For people who have problems reading, such as the dyslexic or the elderly with poor eyesight, the Web can be difficult to understand and follow. The text on web pages may be too small to read, or the spatial relations between objects on the screen may cause confusion. One solution to this problem is to re-design the web page with much larger text, and simplified spatial relationships. Because of the color-intensive nature of web pages, the color-blind may also find it difficult to navigate the Web. For example, in most web browsers, text that also operates as a link appears in a different color to distinguish it from regular text. Furthermore, links that have been previously followed, i.e., the URL resource to which the link refers has been previously downloaded, appear in a different color than a link which has not been followed. These color subtleties may be lost on the color-blind. One solution would be to translate these color cues in to some sort of visual cue which can be seen by the color-blind.

Those who are inexperienced, or scared, of computers have their own brand of difficulties with the Web. The more complicated websites, which assume a thorough familiarity with the Web and how the Web works, may be mystifying to the computer-illiterate. The navigation principles, the use of links, the nature of pop-up windows, and other features of the Web might merely confuse the computer-illiterate, rather than make the experience easy and user-friendly.

The various solutions to adjusting the Web for people with special needs bring up their own various problems. The solution of keeping several different versions of each web page, one for each special need, would be expensive both in terms of storage and creation. Furthermore, one of the great advantages of the Web, the fact that a web page can be altered very quickly, would be destroyed by the delay in translating and creating all the various versions of the web page. One could also create a universal web page that will serve all special needs as well as regular use, but it would be difficult to take all special needs into account simultaneously, as indicated by Michael G. Paciello's article "Access to Electronic Information by People with Disabilities", at page 235 of the IEEE Proceedings of COMPCON '97, which is hereby incorporated by reference. Furthermore, a universal web page would likely result in a "lowest common denominator" web page, capable of being understood by all, but lacking any artistic verve as well as not taking advantage of the media flexibility available on the Web. Another problem is that a standard would have to be developed and accepted by industry (and the Internet Engineering Task Force) for either the universal web page or the multiple special needs web pages in order that the web pages be operable in all web browsers. This brings up the further problem that each special need, e.g., blindness, deafness, dyslexia, would require its own special standard.

Another solution would be to have a live interpreter connected to the user with special needs. This interpreter could be present at the computer with the special needs user, or connected to the special needs user's computer through real-time networking. In this manner, the special needs user would receive accurate and timely interpretations of each web page. Furthermore, the special needs user could ask the interpreter questions in order that the user fully understand each web page. This solution may be very effective, but it would also be very expensive and very time consuming. There is also the further problem of who would bear the costs of this endeavor, the special needs user or the web page producer.

As detailed above, most solutions would require a great deal more expense and effort from either those that maintain web pages and websites or those users with special needs.

Therefore, there is a need for a system and method that provides web page content for users with special needs. There is a further need for a system and method that provides web page content for users with special needs without requiring undue expense and effort by either the user or the web page producer. Such undue expense or effort includes, but is not limited to, the maintenance and creation of multiple web pages for each special need, the agreement among interested parties on standards for each special need, and the requirement of live interpreters to provide the web content for each user with special needs. Furthermore, the system and method should provide that the advantages of the Web, such as the ability to alter web page content in real-time, the ease of creating web pages, and the ease and flexibility of interaction with web pages, be maintained.

SUMMARY OF THE INVENTION

An aspect of this invention is to provide a system and method for providing access to the Web by users with special needs.

Another aspect of this invention is to provide a system and method for proving web pages to users with special needs without undue expense and effort by either the users with special needs or the web page producers.

Yet another aspect of this invention is to provide a system and method that provides web page content to users with special needs.

To fulfill the above and other aspects, a system and method for providing transformed web pages to users with special needs is provided. In one aspect of the system and method, a Translator/Mediator Server is located between the user and the web site. The Translator/Mediator Server translates and transforms the web pages that the user requests from the web site. The translation and transformation of the web pages is directed towards the particular needs of the user.

BRIEF DESCRIPTION OF THE FIGURES

The foregoing and other objects, aspects and advantages will be better understood from the following detailed description of preferred embodiments of the invention with reference to the following drawings.

DETAILED DESCRIPTION OF THE PREFERRED EMBODIMENTS

In the following description, the terms "server" and "database" are used in a generic functional sense. The term "server" should be understood within the client/server architectural model—the client requests a service, the server provides a service. The term "database" can be understood in its most broad definition, as a data structure storing records. Thus, the servers and databases described below are not necessarily housed in different pieces of hardware. Indeed, any of the servers or databases could be implemented using a distributed network system, where the functional elements of a server or database are not only distributed among nodes, but will often migrate from node to node. On the opposite end of the spectrum, all of the servers and databases discussed below could be resident on one mainframe computer. However much of each server or database is implemented in software, firmware, or hardware is also open to many variations, as is well known in the art.

In like manner, the terms "network", "computer" and "computing device" are used in the most general sense. A "computer" or "computing device" is any computing means, from a single microprocessor or micro-controller to a computer system distributed over multiple processing nodes. A "network" includes any means that connects computers. The term "module" is meant to indicate some sort of processing means, whether implemented in software, hardware, or firmware. Other terms in the text are also to be understood in a generic functional sense, as would be known by one skilled in the art.

Although the preferred embodiments assume that the downloaded web pages are written in HTML, any markup language (e.g., eXtensible Markup Language) could be used in the present invention. Furthermore, in some embodiments, the downloaded material may be other types of multimedia content playable on a computer device.

In the preferred embodiments of the present invention, there is a mediator or translator between the web site and the special needs user. The mediator/translator downloads web pages from the web site, translates them into a format compatible with the special needs of the special needs user, and uploads the translated web page to the special needs user's web browser. In some embodiments, the web browser of the special needs user is modified for special needs presentations; in other embodiments, the web browser of the special needs user is any of the standard web browsers, e.g. Netscape Navigator™, Internet Explorer™, etc.

I. Location of the Translator/Mediator Server

Figure 1A:
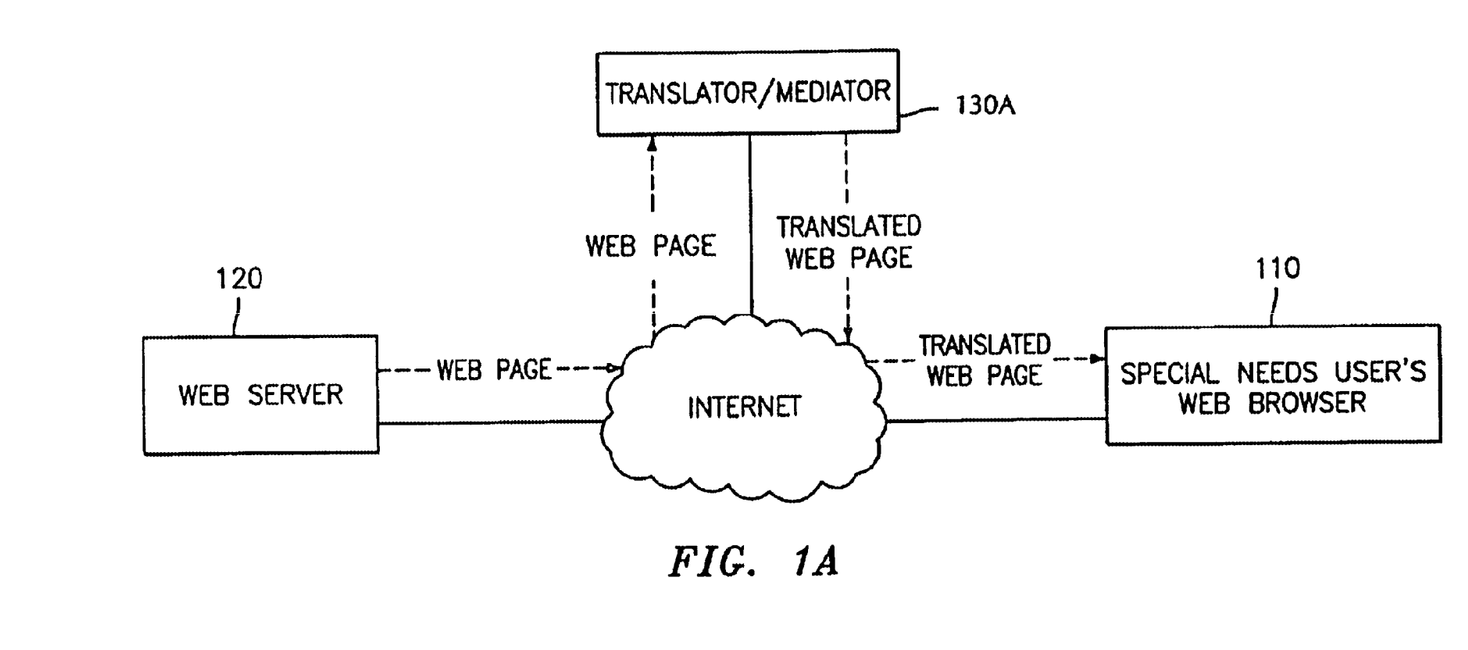
FIGS. 1A to 1B are block diagrams of locations in which embodiments of the present invention may be employed.
Figure 1B:
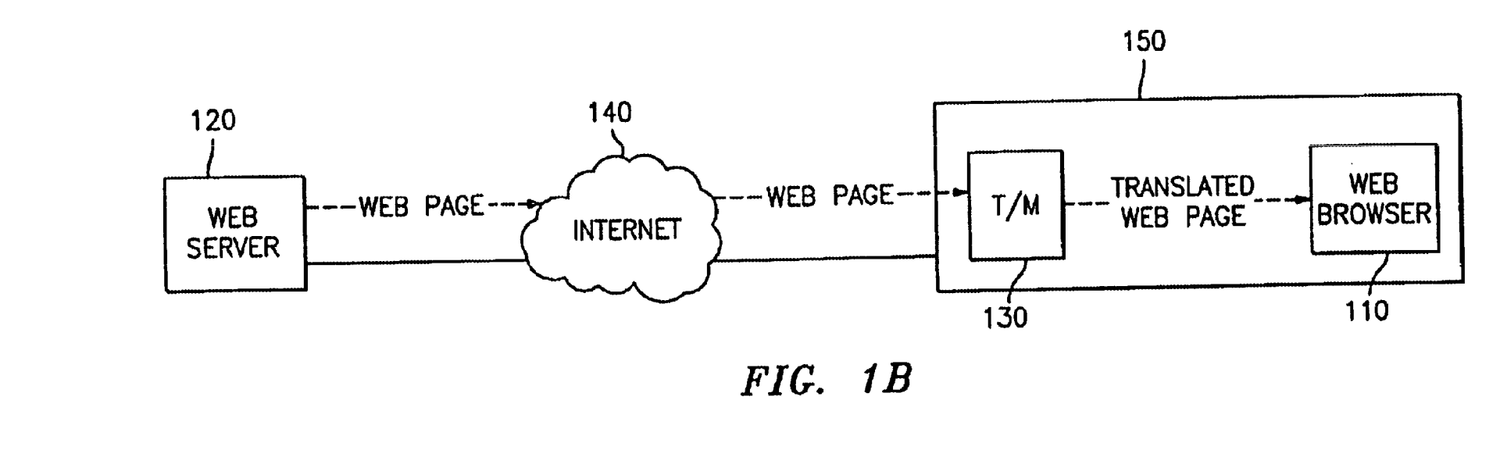
Figure 2A:
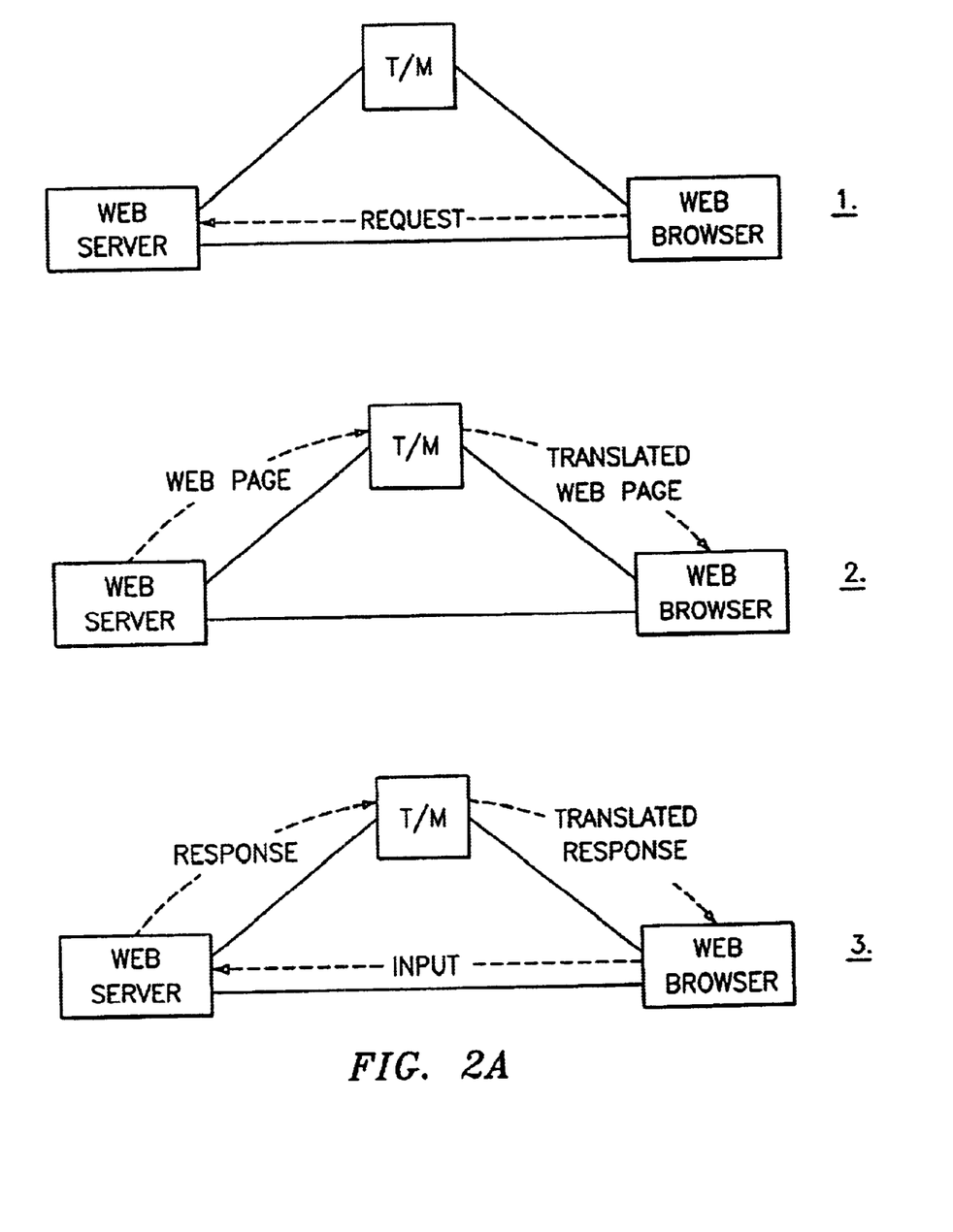
FIGS. 2A and 2B are block diagrams of ways of introducing and maintaining a Translator/Mediator Server between a special needs user's web browser and a web server with the desired web page according to preferred embodiments of the present invention.
Figure 2B:
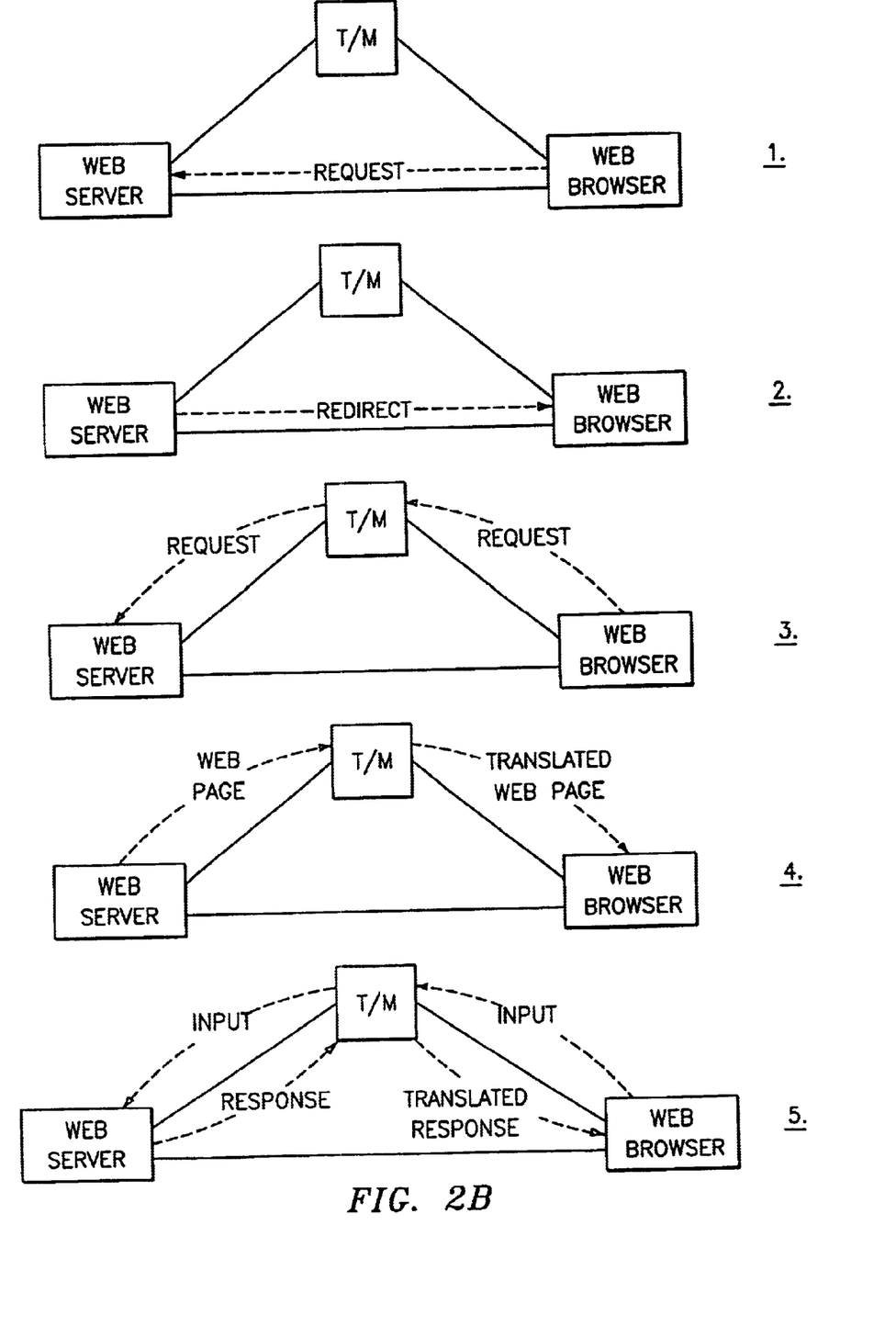

As shown in FIGS. 1A and 1B, the location of the translator/mediator can vary from embodiment to embodiment. In FIG. 1A, a Translator/Mediator Server 130A, a Web Server 120, and a Special Needs User's Web Browser are connected to the Internet 140. After receiving a request from the Special Needs User's Web Browser 110 (as shown in FIGS. 2A and 2B below), Web Server 120 transmits a web page to Translator/Mediator Server 130A. Translator/Mediator Server 130A translates the web page and transfers it to the Special Needs User's Web Browser 110. In this embodiment, the server operating as Translator/Mediator Server 130A may be physically located anywhere, as long as it maintains a connection with the Internet 140.

Since, during normal functioning, a web browser communicates directly with the web server, there needs to be a procedure to introduce and maintain the translator/mediator between the web browser and web server. In the preferred embodiments, this is performed in one of two ways, which are illustrated in FIGS. 2A and 2B. Although the communication between the translator/mediator, the web server, and the web browser is performed over the Internet, FIGS. 2A and 2B uses the simplification of three communication links being maintained between the three elements.

The first way to introduce and maintain the translator/mediator between the web browser and the web server is shown in FIG. 2A. The first way has the translator/mediator acting as a one-way translator. After the web browser requests a web page from the web server (step 1), the web server transmits the requested web page to the translator/mediator, rather than back to the web browser, and the translator/mediator translates the web page and sends it to the web browser (step 2). Since the web server is initiating contact with the translator/mediator, it must send the IP address of the web browser, along with the requested web page, to the translator/mediator. After this, the web browser still sends input to the web server, but the web server always responds through the translator/mediator (step 3). In this embodiment, because the input goes directly from the web browser to the web server, the translated web page must be implemented in such a way that the output from it is in the same format as the untranslated version of the web page. Otherwise, the web server would not know how to respond.

The second way to introduce and maintain the translator/mediator between the web browser and the web server is shown in FIG. 2B. The second way has the translator/mediator acting similarly to a proxy server. After the web browser requests a web page from the web server (step 1), the web server send a redirect message to the web browser (step 2). In response, the web browser sends the request to the translator mediator, which forwards it to the web server (step 3). The web server responds to the request with the requested web page, which the translator/mediator translates and transmits to the web browser (step 4). After this, the web browser and the web server interact only through the translator/mediator (step 5). In this embodiment, since the web browser input goes through the translator/mediator, the translated web page can be implemented more freely. This is because the input from the web browser can be translated by the translator/mediator into the appropriate format for the web server.

In both FIGS. 2A and 2B, it is assumed that the web server has a means of determining that the request is from a user with special needs. This could be accomplished in a variety of ways, as is well-known in the art. For example, the original request from the web browser may have a flag or field indicating it is from a user with special needs, and another flag or field indicating what that special need is. This would allow the web server to focus the response through the appropriate translator/mediator. For another example, the web browser may first download a regular web page which has a link for one or more special needs. This would occur before step 1, and, when the user clicks that link, the request shown in step 1 is generated. There are many more ways that the user could be identified as a special needs user to the web server.

FIGS. 2A and 2B show two ways of introducing the translator mediator according to the preferred embodiments of the present invention. However, in other embodiments, other procedures may be used. For example, the web browser of the special needs user might be set up to always send requests through one or more translator/mediators. Thus, the procedure would begin at step 3 of FIG. 2B. The web browser could be reconfigured to do this, or a simple plug-in might be downloaded that would make it possible. Once again, there are many more ways of introducing the translator/mediator, as is well-known in the art.

Returning to the description of the possible locations of the translator/mediator, FIG. 1B shows a preferred embodiment where the Translator/Mediator Server 130B is implemented within the special needs user's Computing Device 150. The Computing Device 150 also runs Web Browser 110 and maintains a connection with the Internet 140. is connected. The special needs user's Computing Device 150 could be a Personal Digital Assistant (PDA), a personal computer (PC), an embedded device, or two or more computing devices connected over a network. The Web Server 120 is connected to the Internet 140, and, in response to a request, sends a web page to the Computing Device 150. The Translator/Mediator Server 130B translates the web page and provides the translated web page to Web Browser 110.

In this embodiment, since the Translator/Mediator Server 130B is implemented in the user's Computing Device 150, the problems concerning requests, responses, and input, as solved in FIGS. 2A and 2B, do not exist. Furthermore, the Translator/Mediator Server 130B may be tailored to the needs of the particular special needs user or users that use Computing Device 150. Because the Translator/Mediator Server 130B in FIG. 1B can be custom-fit to one particular special need, it would not need the computing resources of the Translator/Mediator Server 130A in FIG. 1A, which would have to be universal, i.e., be able to meet any special need. The Translator/Mediator 130B of FIG. 1B maybe implemented as a plug-in to Web Browser 110. It could be implemented as a chip, or an independent program; there are many possible implementations, as is well-known in the art.

Although in some of the preferred embodiments the Web Browser 110 is a typical standard web browser, e.g., Netscape Navigator™ or Internet Explorer™, in other embodiments the Web Browser 110 may be a special browser that has already been adapted to a special need. For example, Web Browser 110 may be adapted to output Braille and a synthesized human voice for a blind or seeing-impaired user. Likewise, the Web Browser 110 may be adapted to accept non-keyboard input, such as a speech recognition program. In these cases, the Translator/Mediator Server 130 which is used with the specialized browser should be implemented with an eye towards the input/output needs of the specialized browser. This would maximize both the output, i.e., the presentation of the web page to the blind or seeing-impaired, and the input, i.e., the transmission from the Translator/Mediator Server 130 to the specialized web browser.

Furthermore, regarding the location of the Translator/Mediator Server 130A, it should be noted that, another embodiment, the translator/Mediator Server 130A is completely decentralized and distributed over the Internet. This type of distribution would provide locally cached copies of user records and the modules and submodules that constitute the Translator/Mediator 13OA. Because of this distribution, the service would avoid the bottlenecks and slowdowns of con-imunication that are endemic on the Internet. One company that provides a system of distributed servers on the Internet is Akamai™. On the opposite extreme from complete distribution would be a Translator/Mediator Server 130A completely centralized in one mainframe.

II. Universal Translator/Mediator Server

A Universal Translator/Mediator Server is a Translator/Mediator Server able to translate any web page into a format suitable for a user with any type of special need. The Universal Translator/Mediator Server is used in an environment like FIG. 1A, where the Translator/Mediator Server 130A is expected to translate web pages for the Web Browser 110 of any special needs user, whether blind, deaf, or computer illiterate. At least two business models can be based on the services provided by the Universal Translator/Mediator Server. In the first business model, which will be referred to as the "provider service", the owner of a particular web site may pay for the Universal Translator/Mediator Server to provide translated web pages to any special needs user who attempts to access them. In the second business model, which will be referred to as the "user service", one or more users with special needs pay for the Universal Translator/Mediator Server to provide them with appropriately translated web pages for any web site they access. In either model, the fee charged could be based on the number of pages accessed or the amount of computing resources used. A hybrid of these two business models is also possible. In the hybrid, an Internet Service Provider (ISP) such as AOL™ or Compuserve™, pays to provide their members with translated web pages on demand. In the preferred embodiments, the Universal Translator/Mediator Server has different constructions based on which entity is paying for the service. This will be discussed further below.

Figure 3:
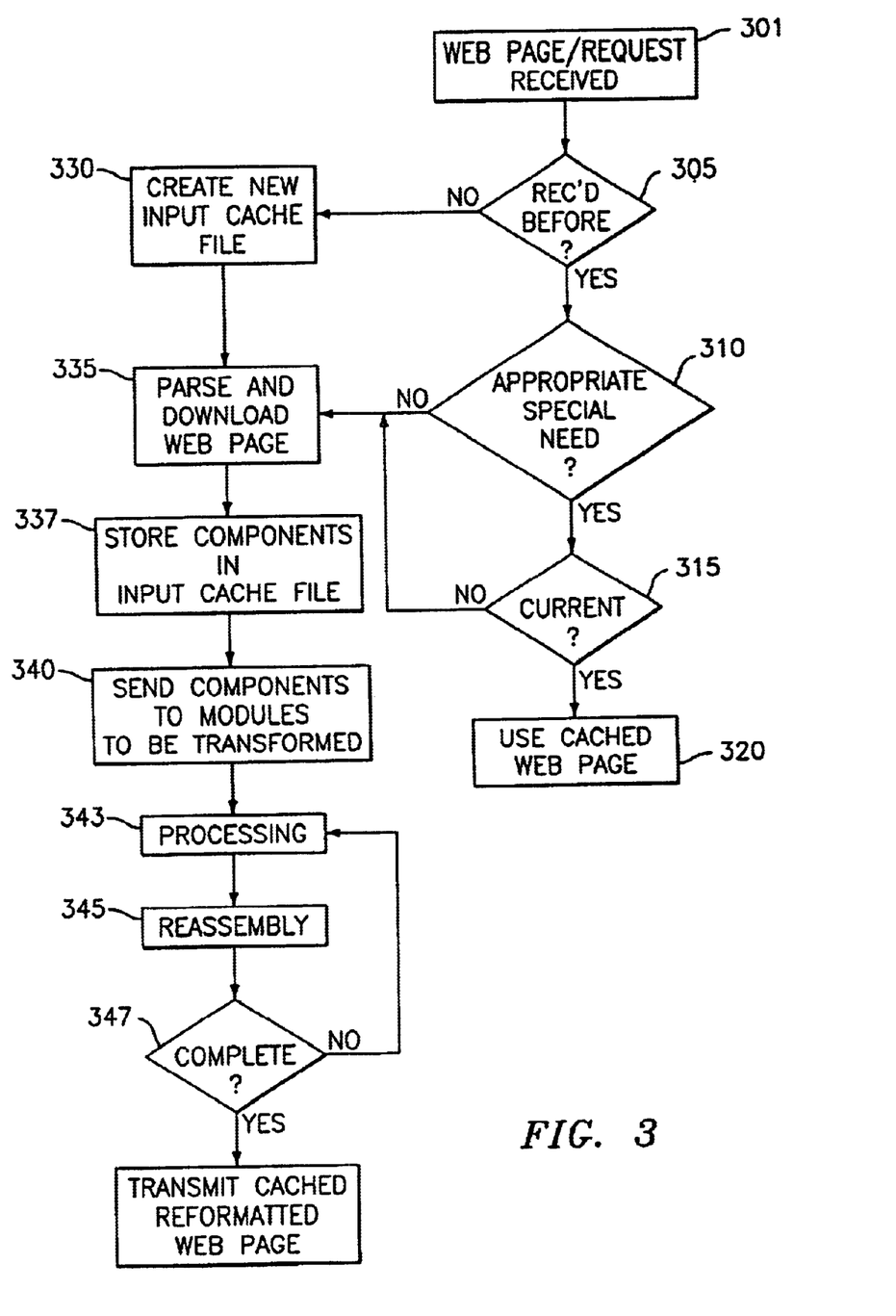
FIG. 3 is a flowchart of a procedure performed by a user service Universal Translator/Mediator Server according to a preferred embodiment of the present invention.
Figure 4:
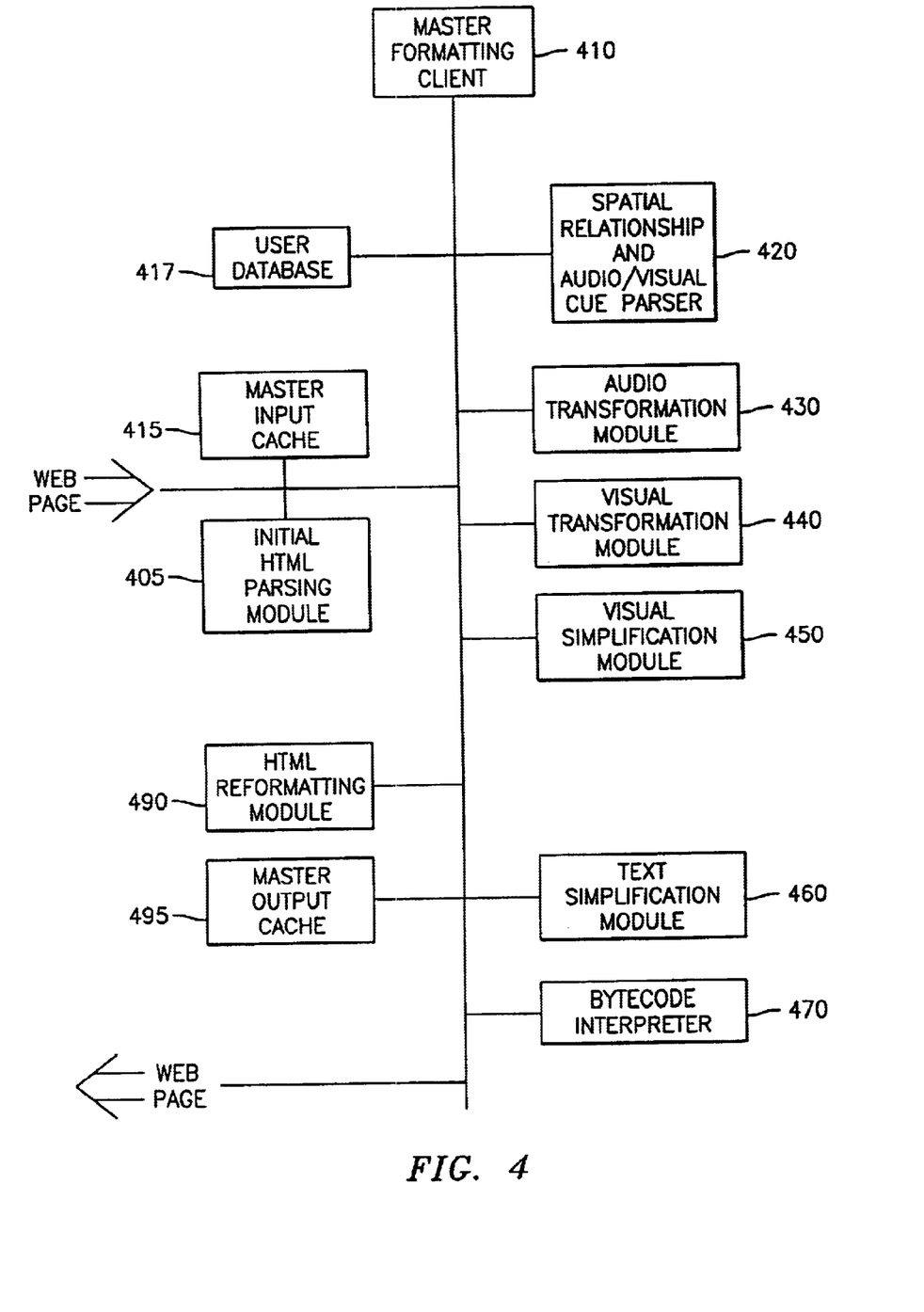
FIG. 4 is a block diagram of the functional modules in a Universal Translator/Mediator Server according to a preferred embodiment of the present invention.

FIG. 3 is the flowchart for a procedure performed by a user service Universal Translator/Mediator Server according to a preferred embodiment of the present invention. FIG. 4 shows the functional modules in a Universal Translator/Mediator Server which is able to perform the procedure of FIG. 3.

In FIG. 3, the procedure begins when, at step 301, either a web page or a request for a web page is received by the Universal Translator/Mediator Server. Whether it is a web page or a request depends on the embodiment. In an embodiment like FIG. 2B, where the web server redirects the request to the Translator/Mediator Server, or in an embodiment where the web browser automatically sends the initial request to the Translator/Mediator Server, a request is received in step 301. In an embodiment like FIG. 2B, a web page is received at step 301 (step 2 of FIG. 2B). For the following description, "the web page" is meant to refer to the request, the requested web page, or the received web page, depending on the context.

At step 305, the Master Formatting Client 410 in FIG. 4 determines whether the web page that has arrived or been requested has been translated before. The Master Formatting Client 410 is the brain of the Universal Translator/Mediator Server, directing traffic and directing the performance of the other modules. To determine whether the web page has been translated before, the Master Formatting Client 410 checks the index of Master Output Cache 495, where output reformatted web pages, and their associated resources, are stored. If the translated web page is in the Master Output Cache 495, the Master Formatting Client 410 determines, in step 310, whether the web page was previously translated for the appropriate special need. For example, the web page may have been previously translated for a deaf or hearing-impaired user, but is presently required by a blind or seeing-impaired user. In that case, the previously reformatted web page in the Master Output Cache 495 is of no use.

If, in step 310, the previously reformatted web page is formatted for the appropriate special need, the Master Formatting Client 410 then determines whether the previously reformatted web page in the Master Output Cache 495 is current in step 315. Step 315 may be performed in a variety of ways, as is known to one skilled in the art. One way would be to store a time index with each cached previously reformatted web page, and, if the previously reformatted web page is beyond a certain age, it is determined to be not current. In order to avoid unnecessarily repetitive formatting, another way would be to compare the present web page and a cached web page. Because the format of the previously reformatted web page cached in the Master Output Cache 495 is different than the present regular web page, a method would need to be employed to enable the comparison. For example, a partial comparison could be made, where certain parts of the present web page are translated and formatted, and then compared with the corresponding parts of the cached previously reformatted web page.

In another embodiment, a Master Input Cache 415 caches an unformatted web page file for each translated web page. Thus, to perform step 315, the Master Formatting Client 410 compares the current web page with the cached unformatted web page file in the Master Input Cache 415, rather than the cached reformatted web page in the Master Output Cache 495. In a manner similar to a PC cache, old web page files in either the Master Input Cache 415 or the Master Output Cache 495, if they have been unused for a predetermined period of time, are deleted. The predetermined period of time for the Master Output Cache 495 is shorter than the predetermined period of time for the Master Input Cache 415. This is because certain popular web sites may have pages that are downloaded by different users with different special needs. The web page files in the Master Input Cache 415 are raw and unformatted, so that multiple formatted web pages, each for a different special need, may be created from each one. On the other hand, each web page file in the Master Output Cache 495 is suitable for only one special need. In this embodiment, the Master Fonnatting Client 410 would also inherently determine whether a reformatted web page in the Master Output Cache 495, corresponding to the unformatted web page file in the Master Input Cache 410, exists.

Figure 5:
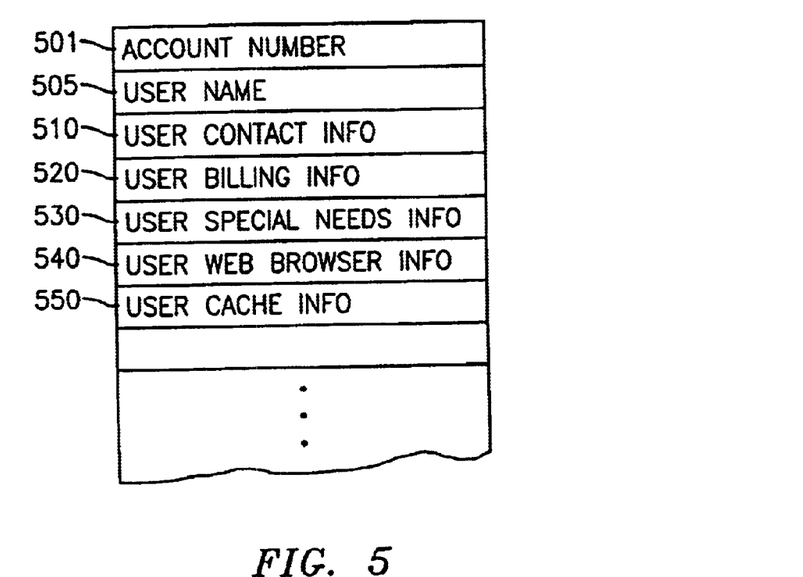
FIG. 5 is an exemplary User Record in a User Database according to an embodiment of the present invention.

In the preferred embodiment of the user service model, a more complicated caching system is used. Since individual users are the paying customers, each user has a User Database Record in User Database 417. An exemplary User Database Record is shown in FIG. 5. Besides the Account Number 501, User Name 505, User Contact Info 510, User Billing Info 520, User Special Needs Info 530, and User Web Browser Info 540, the User Database Record contains User Cache Info 550. In some embodiments, the Master Output Cache 495 is separated into smaller caches for each individual user. The User Cache Info 550 would give a memory address for that user's cache as well as other relevant data. In a more complicated caching system, the User Cache Info 550 includes an index of what is cached at the user's web browser. Although this requires a tighter integration of the user's web browser with the Translator/Mediator Server, it is much more efficient and less wasteful of memory resources. When a more complicated caching system is used, steps 305 and 315 also access this index of what is stored in the local cache at the user's web browser (in this embodiment, step 310 would be unnecessary if the answer to step 305 is "YES").

If it is determined in step 315 that the cached formatted web page is current, the Master Formatting Client 410 directs the cached formatted web page to be transmitted to the user's web browser at step 320. When using the more complicated caching system discussed above, if it is determined that the formatted web page at the user's web browser is current, the Master Formatting Client 410 directs the user's web browser to produce its own locally cached formatted web page.

On the other hand, returning to step 305, if the Master Formatting Client 410 determines that the web page has not been translated before, the Master Formatting Client 410, at step 330, creates a new file for the untranslated web page in Master Input Cache 415. Returning to step 310, if the Master Formatting Client 410 determines that the cached formatted web page is not formatted for the particular special need of the present user, the procedure jumps to step 335, which will be described below. Returning to step 315, if the Master Formatting Client 410 determines that the cached formatted web age is not current, the procedure, once again, jumps to step 335.

In step 335, the Master Formatting Client 410 directs the Initial HTML Parsing Module 405 to parse the web page. During this initial parsing, the Initial HTML Parsing Module 405 parses the HTML that constitutes the input web page, which is in a format unsuitable for a special needs user, and also downloads the various resources, applets, etc. that are indicated in the HTML. As an example of a resource, consider a graphic that appears on a web page. The contents of the graphic, such as pixel and color data, are not in the HTML of web page, but the HTML does have information indicating where to position the graphic, what size it should be, and where the actual graphic file is located. The Initial HTML Parsing Module 405 parses out from the HTML the locations of the resources, like the graphic, and downloads those resources. This function is in addition to the general initial parsing of the HTML, when the Initial HTML Parsing Module takes the elements of the web page, as indicated by the web page such as text, fonts, relative positions, etc. and translates them into tokens. These tokens can be used by the other modules in the Universal Translator/Mediator Server, as will be described below. As indicated in step 337 in FIG. 4, the results of the initial parsing, the tokens and downloaded resources, are all stored in a single cache file of the Master Input Cache 415.

Figure 6:
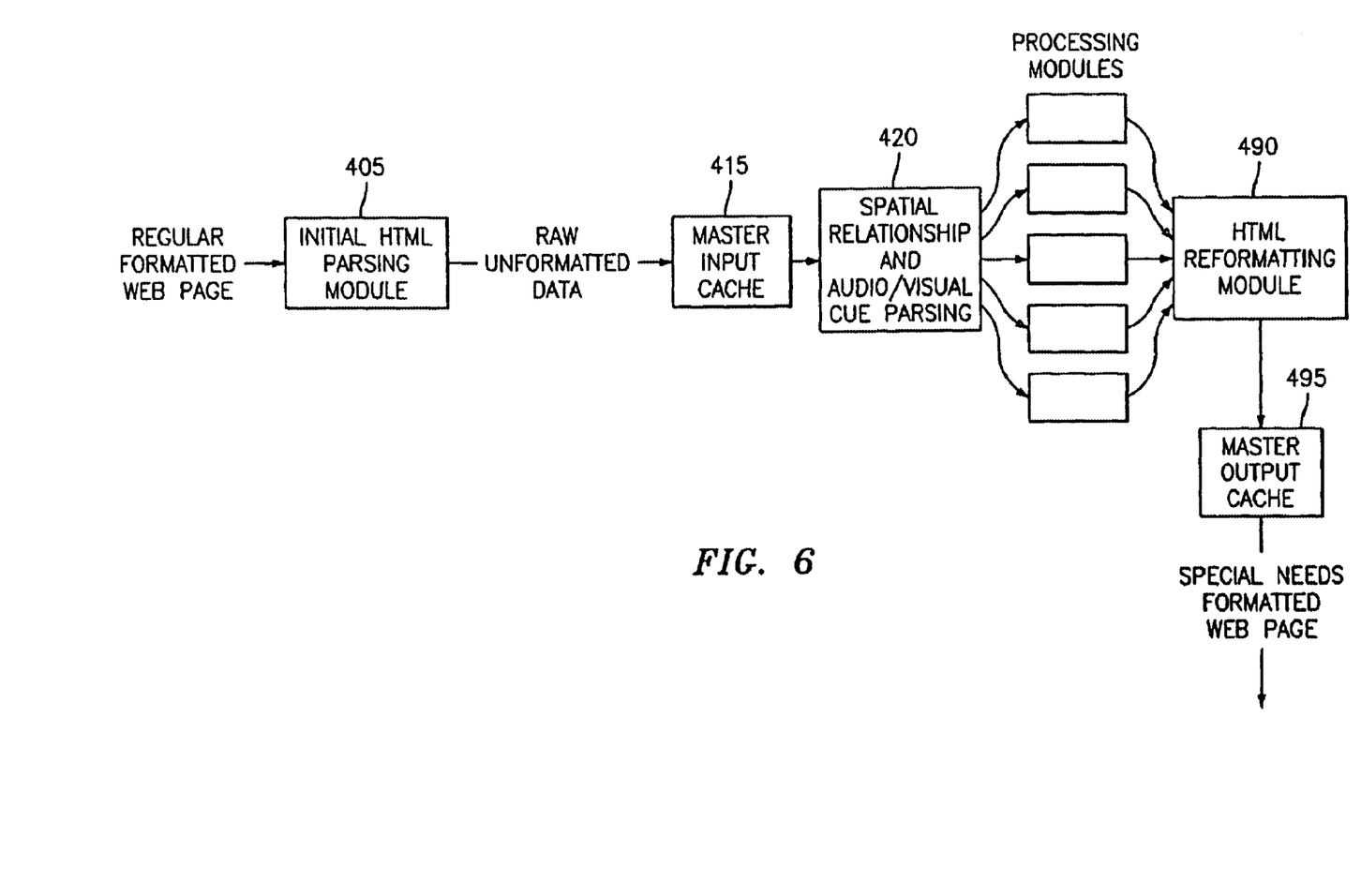
FIG. 6 is an overview of transforming and caching process performed by a Universal Translator/Mediator Server according to an embodiment of the present invention.

One way of looking at the Initial HTML Parsing Module 405 is that it translates the regular web page into unformatted raw data, which is stored in a file in the Master Input Cache 415. This cached unformatted raw data is input, under the direction of the Master Formatting Client 410, into the other modules of the Universal Translator/Mediator Server. The other modules reformat the raw data in a manner appropriate to a particular special need, and the combined results of the reformatting are put together as a reformatted web page, which is cached in Master Output Cache 495 and transmitted to the user's web browser. An overview of this flow of data, in the form of a block diagram, is shown in FIG. 6.

Returning to FIG. 3, after the raw data constituting the input web page is completely cached in the file in the Master Input Cache 415 in step 337, the Master Formatting Client 410 directs each of the different constituent raw unformatted components of the cached file to different modules for processing in step 340. The different modules process the different components in step 343, and the processed components are reassembled, under the direction of the Master Formatting Client 410 in step 345, as a reformatted web page in the Master Output Cache 495. The type of processing depends on the type of special needs reformatted web page that needs to be created, as will be discussed more fully in the next section. The processing (step 343) and assembling (step 345) continue until the Master Formatting Client 410 determines that the reformatted web page is complete, in step 347. If the reformatted web page is complete in step 347, the cached and reformatted web page is transmitted to the special needs user's web browser for presentation at step 350.

III. Processing Modules in the Universal Translator/Mediator Server

As described in the last section, the Master Formatting Client 410 controls the various processing modules of the Universal Translator/Mediator Server to reformat the raw data in the Master Input Cache 415 into a web page suitable for a particular special need. These processing modules are focused on the different reformatting tasks that may be necessary in a Universal Translator/Mediator Server, and they include, but are not limited to, the Spatial Relationship and Audio/Visual Cue Parser 420, Audio Transformation Module 430, Visual Transformation Module 440, Visual Simplification Module 450, Text Simplification Module 460, and Bytecode Interpreter 470, as shown in FIG. 4. For some special needs, only one or two modules are needed; for others, all modules may be used. In embodiments using a Translator/Mediator Server integrated into the special needs user's web browser, only the processing modules required for that special need are implemented.

The first module, the Spatial Relationship and Audio/Visual Cue Parser 420, is not a transformation module like the rest, but an analysis module that the Master Formatting Client 410 uses to determine what transformations are needed. The Spatial Relationship and Audio/Visual Cue Parser recognizes the various, mostly non-textual, means for imparting information within the initially parsed web page in the Master Input Cache 415. Examples of information imparting means include animations, marquees, pop-up menus, scrolling menus, blinking text, the colors and design of textual links, the changing of the cursor icon when it moves over certain sections of a web page, the relative locations of visual elements on a web page, boxes that indicate that the user needs to enter alphanumeric text, radio buttons, and other graphics. Once recognized, the information imparting means is analyzed by the Spatial Relationship and Audio/Visual Cue Parser 420. In some cases, the information imparting means is translated into a more rudimentary format, so that the processing modules can more easily process them.

The Master Formatting Client 410 directs the Spatial Relationship and Audio/Visual Cue Parser 420 to perform different parsing procedures based on the special needs of the user. For example, if the special needs user is color-blind, the Spatial Relationship and Audio/Visual Cue Parser 420 is directed to parse out all of the information imparting means which use color. The change of a link's color to indicate that it has been clicked before is parsed out. If the special needs user is deaf or hearing-impaired the Spatial Relationship and Audio/Visual Cue Parser 420 parses out the information imparting means that use noise. Audio files containing speech or music and audio cues would be parsed out and separately identified.

If the special needs user is blind, the entire web page is parsed, the elements are separately identified, and then the elements are analyzed. The relative positions of the elements are analyzed to determine whether a hierarchy of information is intended. Elements that require input are separately identified and analyzed to determine what type of input is intended and its effect. Elements that offer choices are separately identified and analyzed to determine the list of choices and their effects. In other words, all information imparting means are separately identified, analyzed to determine what type of information is being imparted, and what the content of that information is. For example, consider a web page that has a drop-down menu for selecting the next web page in the web site to which to surf, such as the Home page, the Site Map, the Order page, the Search page, etc. The Parser 420 would separately identify this drop-down menu as an information imparting means concerning choices. Next, the Parser 420 determines that the choices offered concern the next URL resource the web browser is going to download, and then determines that the choices are URL #1 (the Home page), URL #2 (the Site Map), URL #3 (the Order page), etc. Once the Parser 420 has completed this analysis, the information imparting means is put into a rudimentary form for another module to process. In the example of the drop down menu, the rudimentary form would consist of the choice being offered (the next hop), and the content of the choices (both the name given to the choice, e.g., "the Home page", and what happens if the choice is selected, e.g. the web browser downloads URL #1).

In the preferred embodiment, if the special needs user is seeing-impaired, rather than blind, there is a field in the special needs user's User Record that indicates the level of impairment. Different levels of parsing are performed for the different levels of impairment. If the user just has difficulty seeing small objects or reading small or regularly-sized text, the Parser 420 merely identifies the visual elements of the page, including text, and the Master Formatting Client 420 sends those elements to the HTML Reformatting Module 490. The purpose of the HTML Reformatting Module 490 is to reformat the output of the modules into a HTML web page, which is then cached in the Master Output Cache 495. The Master Formatting Client 420 directs the HTML Reformatting Module 490 to increase the font size of the type, and to increase the size of the icons, graphics, and pictures, by changing the HTML script.

The HTML Reformatting Module 490 performs whatever final tasks are necessary to take the output of the processing modules and create an output web page. In the preferred embodiment, this includes 1) taking the raw data in the Master Input Cache 415 of components which don't need to be transformed and reformatting them; 2) changing processing module output into HTML format; and 3) creating the infrastructure needed for a complete web page. An example of task (3) is once each transformed element of the web page has arrived at the HTML Reformatting Module 490 the spatial or hierarchical relationship between those elements needs to be scripted back into the output web page. This is done under the direction of the Master Formatting Client

410, using the relationships parsed out by Parser 420. In other embodiments, the reformatting may not be in HTML. For example, a blind user's web browser may only take specially formatted audio files as input.

Figure 7:
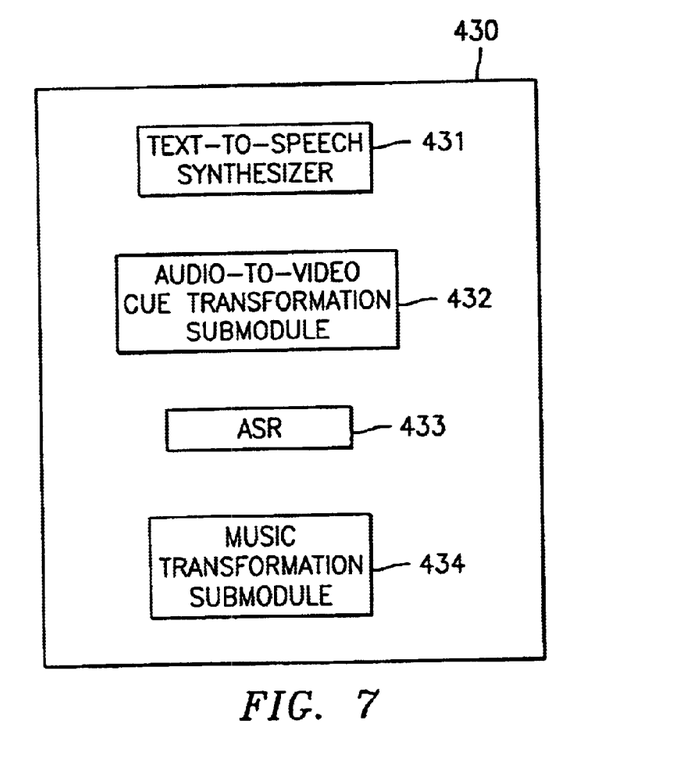
FIG. 7 is a block diagram of the functional submodules in an Audio Transformation Module 430 of the Universal Translator/Mediator Server in FIG. 4 according to a preferred embodiment of the present invention.

Audio Transformation Module 430 has many submodules, some of which are shown in FIG. 7. The Text-to-Speech Synthesizer 431 in FIG. 7 synthesizes a voice to speak an input text. This is used for blind or seeing-impaired users. In other embodiments, some textual elements are changed into synthesized voice for the computer-illiterate, learning disabled, or dyslexic, if it is determined that such a transformation would make the web page more intelligible. The Audio-to-Video Cue Transformation Submodule 432 takes audio cues, such as a beep indicating input, or a dong indicating error, and makes them visual cues, such as a pop-up message or an icon. The Automatic Speech Recognition (ASR) Submodule 433 takes input speech (as an audio file) and transcribes it into output text. This is used for the deaf or hearing-impaired users.

In FIG. 7, Music Transformation Submodule 434 takes input music and transforms it into a format suitable for the deaf or hearing-impaired. For example, Music Transformation Submodule 434 could transform the music audio file into a vibrating means input file, where the web browser has a vibrating means output device attatched to it. Alternatively, Music Transformation Submodule 434 could transform the music audio file into a video output file, where the video output is in the form of oscilloscope output in the web browser. In addition to, or as an alternative to, these transformations, the Music Transformation Submodule 434 could create a text output which describes the music. The description could be based on either a label embedded in the original web page, or the submodule's own analysis of the musical content. In the preferred embodiment, several different types of output are possible, and the preference of the user is indicated in the user's User Record. Music Transformation Submodule 434 can be used to transform any sound file input, not only music audio files.

Figure 8:
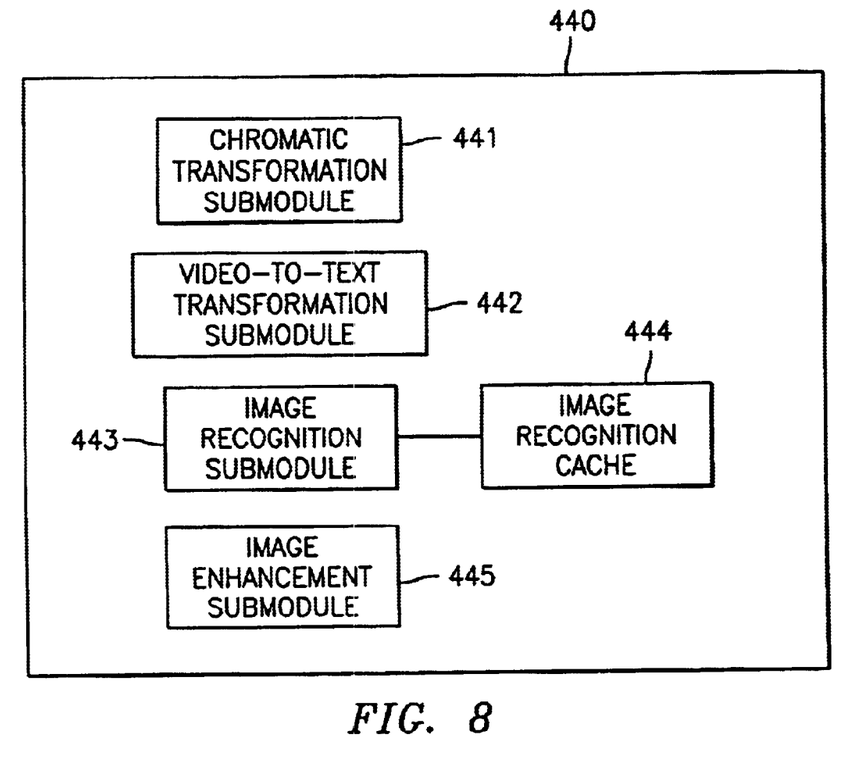
FIG. 8 is a block diagram of the functional submodules in a Visual Transformation Module 440 of the Universal Translator/Mediator Server in FIG. 4 according to a preferred embodiment of the present invention.

The Visual Transformation Module 440 on FIG. 4 also has many submodules, some of which are shown in FIG. 8. The Chromatic Transformation Submodule 441 in FIG. 8 transforms the information imparting functionality of certain elements into one more suitable for the color-blind. The identification of a link by its color, or the change in link color before and after being clicked, is transformed into a change in visual texture or display. An icon, such as an closed door, might appear next to a link in order to indicate to the color-blind that it is a link. If the link is clicked, i.e. downloaded, the icon changes from a closed door to an open door. Other visual metaphors, like an open and closed box or window, could be used. In the preferred embodiment, several different types of visual change are possible, and the preference of the user is indicated in the user's User Record. In other embodiments, the information is imparted to the color-blind user by a pop-up box that appears when the cursor is over the element on the screen, or by a different font.

It should be noted that there is a large variety of means that could be used to impart information, rather than the unsuitable means. Thus, although visual texture or display is substituted for color as the information imparting means, many other means are possible, as is well-known in the art. This is true for all of the substitutions made in the preferred embodiments. In other words, other embodiments of the present invention may use completely different substitution means than those listed and described here.

The Video-to-Text Transformation Submodule 442 in FIG. 8 is used to transform picture or graphic files into a text description for the blind or seeing-impaired. The text description could be based on either a label embedded in the original web page, or Image Recognition Submodule 443's analysis of the visual content. Image Recognition Submodule 443, after performing recognition of an image, caches the textual description of the image, in order to avoid re-performing recognition analysis if the image appears again. These are stored in Image Recognition Cache 444. The Master Formatting Client 410, using the parsing results of the Spatial Relationship and Audio/Visual Cue Parsing Module 420, determines whether an image file should go to the Video-to-Text Transformation Submodule 442 in Video Transformation Module 440. Even for the blind user, some image and graphic files will not go the Video-to-Text Transformation Submodule 443, and are instead processed by other modules. Image Enhancement Submodule 445 in FIG. 8 is used to enhance images for particular special needs. For example, people with autism respond well to moving colors, so the Image Enhancement Submodule 445 highlights that feature in images for autistic users.

The Visual Simplification Module 450 in FIG. 4 is used to simplify the visual display of the web page. This simplification process is useful for the computer-illiterate, the learning disabled, the dyslexic, the blind or seeing-impaired, etc. The Visual Simplification Module is also made up of many submodules, some of which are shown in FIG. 9.

Figure 9:
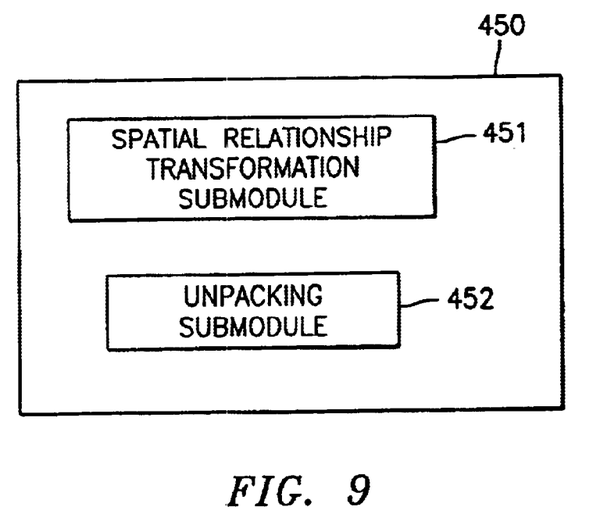
FIG. 9 is a block diagram of the functional submodules in a Visual Simplification Module 450 of the Universal Translator/Mediator Server in FIG. 4 according to a preferred embodiment of the present invention.

In FIG. 9, the Spatial Relationship Transformation Submodule 451 takes the information imparting content of the spatial relationships in the input web page, as parsed out by the Spatial Relationship and Audio/Visual Cue Parsing Module 420, and transforms these relationships to be in a format suitable for a particular special need. For example, an input web page that has multiple visual elements which are placed in an uneven row may confuse a computer-illiterate person. Spatial Relationship Transformation Submodule 451 places these in one single column, with each item following underneath the other, without other items appearing in the same row. As another example, if the relative locations of the visual elements in a web page indicate an informational hierarchy, these elements may be re-aligned in a single column with a clear order of precedence. The spatial relationships of web pages that are being reformatted for the blind are transformed by the Spatial Relationship Transformation Submodule 451 so that the order of material being presented to the user in audio format are presented in an intelligible manner. After the material is transformed into audio output, it will be sorted based upon the results of the Spatial Relationship Transformation Submodule 451. For instance, if a navigational bar or graphic appears in the upper left-hand corner of the web page, the transformed audio describing the graphic or navigational bar might be presented first to the blind user, making the page difficult to understand. By contrast, if the most important item, such as the title of the page, or the largest text, is presented first to the blind user, it will put everything that follows into context. Spatial Relationship Transformation Submodule 451 performs this function.

The Unpacking Submodule 452 in FIG. 9 takes standard Web objects, and "unpacks" them, so that the intended meaning is clear. For example, the drop down menu that is described above as being parsed by the Spatial Relationship and Audio/Visual Parser 420 would be unpacked so that each choice would be clearly displayed and described on the output web page. Thus, the first choice would appear as a button with the text "If you press this button, the web browser will go to the Home Page"; the second choice would appear under the first button, with the text "If you press this button, the web browser will go to the Site Map"; and so on. As another example, buttons are unpacked by the Unpacking Submodule 452 so that the action required (e.g., pressing here), and the reaction caused by the action (e.g., jumping to another web page), are explicitly spelled out for the user. Similar "unpacking" is performed on links, scrolling text, and other standard Web objects.

Returning to FIG. 4, the Text Simplification Module 460 is used to simplify the text in a web page. This is used with the learning disabled, the computer-illiterate, the dyslexic, the blind or seeing-impaired, etc. For users with a different reading comprehension level, such as children or the mentally retarded, Text Simplification Module 460 abridges the text in a web page in both content and vocabulary. Because of the sheer quantity of text in some web pages, Text Simplification Module 460 sometimes abridges the text in web pages that are being transformed to audio for the blind. This is done to reduce the quantity of audio output.

Figure 10:
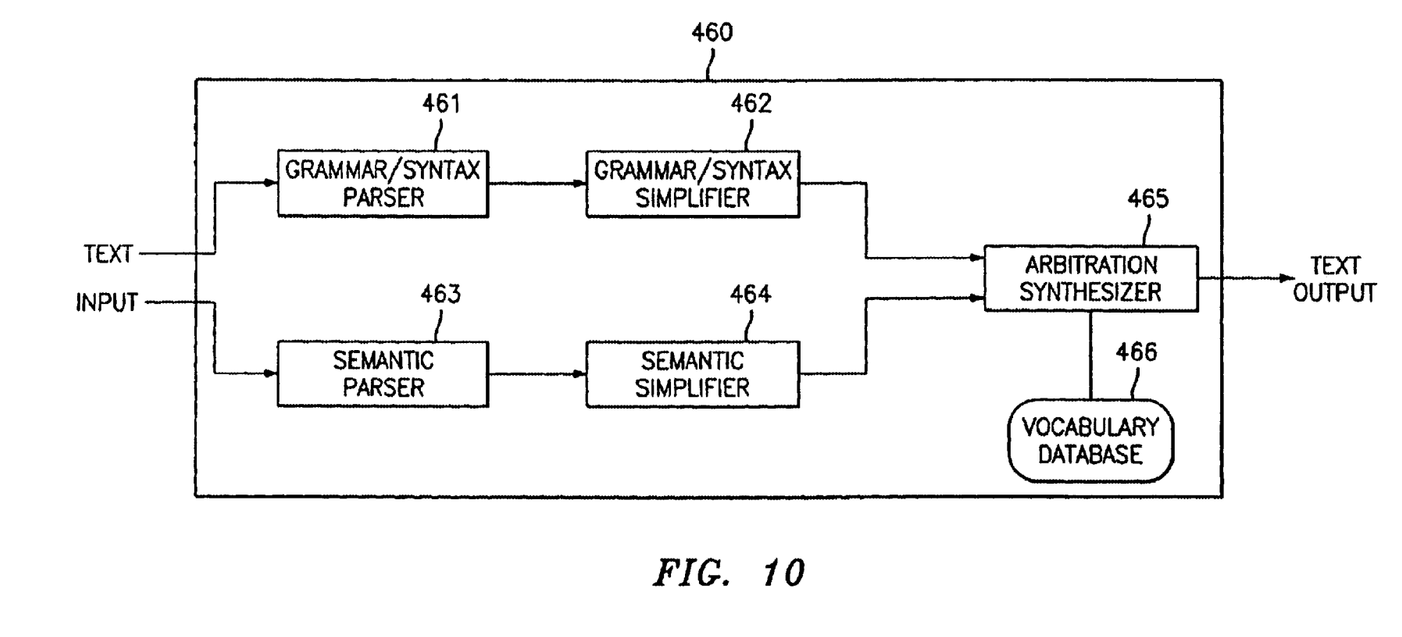
FIG. 10 is a block diagram of the functional submodules in a Text Simplification Module 460 of the Universal Translator/Mediator Server in FIG. 4 according to a preferred embodiment of the present invention.

Text Simplification Module 460 is made up of many submodules, some of which are shown in FIG. 10. The Grammar/Syntax Parser 461 and Semantic Parser 463 in FIG. 10 both receive the input text to be simplified. The Grammar/Syntax Parser 461 defines the grammatical and syntactical structure of sentences in the input text; this information is then sent to the Grammar/Syntax Simplifier 462, which simplifies the parsed material. For example, sentences with passive verbs, such as "object was affected by subject" would be parsed, and then replaced with a simpler form, such as "subject affected object". An example of a Grammar/Syntax Parser is in U.S. Pat. No. 5,991,719 to Yazaki et al., "Semantic Recognition System", which is hereby incorporated by reference.

Simultaneously with this process, the Semantic Parser 463 defines the semantic content of the sentences, phrases, and paragraphs in the input text. The Semantic Simplifier 464 takes this output and rephrases sentences in the simplest form. Semantic Simplifier 464 splits long sentences into semantically equivalent shorter sentences. The Semantic Simplifier 464 has a set of rules for performing semantic simplification. For example, a long phrase (e.g., "... subject has a part that has attribute X ... ") would be replaced by two sentences (e.g., "subject has a part." and "the part has attribute X."). Some words are replaced with simpler synonyms. Rare, technical, or specialized words are replaced with more simple forms. An example of a Semantic Parser is in U.S. Pat. No. 5,109,509 to Katayama et al., "System for Processing Natural Language including Identifying Grammatical Rule and Semantic Concept of an Undefined Word", which is hereby incorporated by reference.

The outputs of the Grammar/Syntax Simplifier 462 and the Semantic Simplifier 464 are input into the Arbitration Synthesizer 465. The Arbitration Synthesizer 465 determines which simplifications or combinations of simplifications will be combined into the final text output. The special need and the level of special need of the user guide this determination. In the preferred embodiment, the level of special need is indicated in the user's User Record in User Database 417. This includes information concerning the mental capabilities of the learning disabled, autistic, dyslexic, etc. In addition, the user's User Record contains information concerning the vocabulary of the special needs user, so that a proper dictionary (e.g., the proper level of word and semantic complexity) is chosen for text transformation. The Simplifiers use words, phrases, and their equivalents, which are keyed by their level of complexity, and which are stored in Vocabulary Database 466.

The Bytecode Interpreter 470 in FIG. 4 is used by the Spatial Relationship and Audio/Visual Parsing Module 420 in order to determine whether any bytecode, such as Java™, needs to be modified for the special needs user. The Bytecode Interpreter 470 is also used to perform the modification.

The modules shown in FIG. 4 do not exhaust the variety of modules which may be used to simplify and transform web pages for special needs users. For instance, in addition to, or perhaps integral with, the Text Simplification Module 460, a Text Filter is used in another embodiment, so that offensive words and phrases may be censored from web pages when the special needs user is a child. Further, a Language Translator is used in another embodiment, where the special needs user needs the text to be in a certain language. Existing solutions for the problems of filtering out inappropriate content and supplying foreign language content share the same problems as the existing solutions for users with special needs. Namely, a large burden of expense and effort is borne by either the user or the web site owner.

The description above concerning FIGS. 3–10 assumes the user service model, but, when a provider service model is employed, different steps may be used than are used in FIG. 3, and different modules and submodules may be used than are used in FIGS. 4–10. Furthermore, the steps, modules, and submodules in each embodiment shown here may be combined, replaced, separated, or interchanged. For example, in the provider service model, since the purpose of the Universal Translator/Mediator Server is to maintain different special needs versions of web pages of paying clients, the Master Output Cache 495 would maintain every different special need category of translated web page, which would be transmitted when needed. The Universal Translator/Mediator Server would check the regular versions of these web pages on a periodic basis, in order to ensure the cached copies are current.

Although shown connected through Internet, local, wide, or metropolitan area networks are used in other embodiments. Further, although the embodiments discussed above uses a web server, any network server system that provides individual files that can be accessed by different authorized groups could be used. In another embodiment, the connections are made point-to-point as telephone calls from each user through a PSTN to a centralized server. The modules and submodules may be implemented by any combination of software, hardware, and firmware, as is well-known in the art.

While the present invention has been described with respect to certain preferred embodiments, it should be understood that the invention is not limited to these particular embodiments, but, on the contrary, the invention is intended to cover all modifications, equivalents, and alternatives falling within the spirit and scope of the invention as defined by the appended claims.

What is claimed is:

1. A computer-based method of providing web page content to a user with special needs, where web page content includes mark-up language and all resources to which the markup language refers, the method comprising the steps of:

receiving a web page;

determining whether the received web page has been previously translated;

determining, if it is determined that the received web page has been previously translated, whether the received web page was previously translated for the appropriate special need;

identifying information imparting means within the received web page;

translating those information imparting means which are difficult for the user with special needs to understand into information means which are easier for the user with special needs to understand; and transmitting the translated web page to the user with special needs.

2. The computer-based method as recited in claim 1, wherein, if it is determined that the received web page has been previously translated, the method further comprises the step of:

determining whether a locally cached version of the received web page is current.

3. The computer-based method as recited in claim 1, wherein the step of identifying information imparting means within the received web page comprises the substeps of:

parsing markup language within the received web page;

downloading all resources to which the markup language refers; and storing the parsed markup language and the downloaded resources in a locally cached input file.

4. The computer-based method as recited in claim 3, wherein the step of identifying information imparting means within the received web page further comprises the substep of:

identifying components of the stored markup language and downloaded resources which are information imparting means that are difficult for the user with special needs to understand.

5. A system for translating web page content for a user with special needs, where web page content includes mark-up language and all resources to which the markup language refers, the system comprising:

means for receiving a web page;

means for determining whether the received web page was previously translated for the appropriate special need;

means for identifying information imparting means within the received web page;

means for translating those information imparting means which are difficult for the user with special needs to understand into information means which are easier for the user with special needs to understand; and means for transmitting the translated web page to the user with special needs.

6. The system as recited in claim 5, further comprising:

means for determining whether the received web page has been previously translated.

7. The system as recited in claim 5, further comprising:

means for determining whether a locally cached version of the received web page is current.

8. The system as recited in claim 5, wherein the means for identifying information imparting means within the received web page comprises:

means for parsing markup language within the received web page;

means for downloading all resources to which the markup language refers; and means for storing the parsed markup language and the downloaded resources in a locally cached input file.

9. The system as recited in claim 8, wherein the means for identifying information imparting means within the received web page further comprises:

means for identifying components of the stored markup language and downloaded resources which are information imparting means that are difficult for the user with special needs to understand.

10. A computer system for translating web page content for a user with special needs, where web page content includes mark-up language and all resources to which the markup language refers, the computer system comprising:

at least one computer-readable memory including:

code that receives a web page;

code that determines whether the received web page was previously translated for the appropriate special need;

code that identifies information imparting means within the received web page;

code that translates those information imparting means which are difficult for the user with special needs to understand into information means which are easier for the user with special needs to understand; and code that transmits the translated web page to the user with special needs.

11. The computer system as recited in claim 10, wherein the at least one computer-readable memory further comprises:

code that determines whether the received web page has been previously translated.

12. The computer system as recited in claim 10, wherein the at least one computer-readable memory further comprises:

code that determines whether a locally cached version of the received web page is current.

13. The computer system as recited in claim 10, wherein the code that identifies information imparting means within the received web page comprises:

code that parses markup language within the received web page;

code that downloads all resources to which the markup language refers; and code that stores the parsed markup language and the downloaded resources in a locally cached input file.

14. The computer system as recited in claim 13, wherein the code that identifies information imparting means within the received web page further comprises:

code that identifies components of the stored markup language and downloaded resources which are information imparting means that are difficult for the user with special needs to understand.

15. A computer-based method of providing web page content to a user with special needs, where web page content includes mark-up language and all resources to which the markup language refers, the method comprising the steps of:

receiving a request for a web page;

determining whether the requested web page has been previously translated;

determining, if it is determined that the requested web page has been previously translated, whether the requested web page was previously translated for the appropriate special need;

determining, if it is determined that the requested web page has been previously translated for the appropriate special need, whether a locally cached version of the requested web page is current; and transmitting, if the locally cached version of the requested web page is current, the locally cached version of the requested web page to the user with special needs.

16. A computer-based method of providing web page content to a user with special needs, where web page content includes mark-up language and all resources to which the markup language refers, the methods comprising the steps of:

identifying information imparting means within the received web page;

determining whether the received web page has been previously translated;

determining, if it is determined that the received web page has been previously translated, whether the received web page was previously translated for the appropriate special need; and translating those information imparting means which are difficult for the user with special needs to understand into information means which are easier for the user with special needs to understand.

* * * * *